(12) United States Patent
Bell et al.

(10) Patent No.: US 7,430,464 B2
(45) Date of Patent: Sep. 30, 2008

(54) DYNAMIC VEHICLE ELECTRICAL SYSTEM TEST

(75) Inventors: Joseph A. Bell, Markle, IN (US); Matthew J. Gumbel, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 549 days.

(21) Appl. No.: 11/080,186

(22) Filed: Mar. 15, 2005

(65) Prior Publication Data

US 2006/0212192 A1    Sep. 21, 2006

(51) Int. Cl.
*G01M 17/007* (2006.01)
*G01R 31/00* (2006.01)

(52) U.S. Cl. .......................................... 701/29; 701/36

(58) Field of Classification Search ..................... 701/31
See application file for complete search history.

(56) References Cited

U.S. PATENT DOCUMENTS

| | | | |
|---|---|---|---|
| 6,396,395 B1 * | 5/2002 | Zielinski et al. .......... 340/425.5 |
| 6,674,288 B2 * | 1/2004 | Gumbel et al. ............. 324/504 |
| 6,680,674 B1 * | 1/2004 | Park ........................... 340/905 |
| 7,124,003 B1 * | 10/2006 | West et al. ..................... 701/29 |
| 2003/0057955 A1 * | 3/2003 | Gumbel et al. ............. 324/504 |
| 2003/0057965 A1 | 3/2003 | Gumbel et al. |
| 2004/0133319 A1 * | 7/2004 | Pillar et al. .................... 701/29 |
| 2006/0044119 A1 * | 3/2006 | Egelhaaf ................. 340/425.5 |

* cited by examiner

*Primary Examiner*—Thomas G. Black
*Assistant Examiner*—Lin B Olsen
(74) *Attorney, Agent, or Firm*—Jeffrey P. Calfa; Gerald W. Askew

(57) ABSTRACT

A system and method for testing operation of that portion of a transportation vehicle's electrical system that has switches accessible for selective actuation by an occupant of an interior of the vehicle to control exterior lamps through an ESC (12). During a learn mode (56) of a test, processor apparatus executes a learn algorithm stored in the ESC and as the learn algorithm executes, a person inside the vehicle operates the switches in a desired sequence to cause the ESC to store data related to the sequence. During a playback mode (58) of the test, the processor apparatus executes a playback algorithm stored in the ESC to cause the ESC to actuate the lamps in accordance with the stored data. A defect in any portion of a lamp circuit is observed by failure of a lamp to illuminate in the stored sequence.

16 Claims, 2 Drawing Sheets

DYNAMIC VEHICLE ELECTRICAL SYSTEM TEST

FIELD OF THE INVENTION

This invention relates generally to the testing of electrical systems of motor vehicles and is particularly directed to the testing of certain controlled devices on the exterior of a vehicle, such as lamps, and their circuits, including controlling devices, such as lamp switches, on the vehicle interior.

BACKGROUND OF THE INVENTION

Motor vehicles have a number of exterior lamps that are turned on and off by switches that are on the interiors of the vehicles. These lamps typically include headlamps, tail lamps, turn signal lamps, stop lamps, and marker lamps. An individual lamp may perform a single function or multiple functions, either by a single illumination element, or by multiple illumination elements.

One example of an exterior lamp that has multiple illumination elements is a dual-beam headlamp that has both a high-beam filament and a low-beam filament.

An example of an exterior lamp that performs multiple functions is a rear stop-turn signal lamp that will illuminate when the driver applies the vehicle service brakes and that will flash when the driver operates the turn signal switch to signal a turn in the direction to the side of the vehicle where the stop-turn signal lamp is located. The controls associated with such a dual-function lamp are arranged such that the turn signal function will override the stop function to enable the lamp to flash when the brakes are being applied.

Present-day motor vehicles have electrical systems that include one or more electrical system controllers, sometimes referred to as an ESC or ESC's. An ESC may be devoted to a particular vehicle system such as the body, chassis, or powertrain. An ESC comprises one or more electronic devices organized and arranged to receive data inputs, to process data according to programmed strategies and algorithms, and to provide data outputs. The ESC performs functions that provide information outputs as well as functions that provide control outputs.

The control functions include control of the exterior lamps in accordance with the status of controlling devices on the vehicle interior. Typical controlling devices are switches like a headlamp switch or turn signal switch. When a switch is turned on, a corresponding data input indicative of the switch status is issued to the ESC. The ESC acts on that input by issuing an output that results in performance of the function controlled by the switch. For example, when the brakes are applied, a stop lamp switch closes to apply a certain potential to a particular input of the ESC. The presence of that potential, which incidentally may be positive, negative, or ground depending on the particular ESC, at that input is understood by the ESC as a data signal calling for the stop lamps to illuminate. The ESC then issues a signal at a particular output to cause the stop lamps to illuminate.

The electronic devices that form an ESC, such as processors, typically operate at low current levels that are unsuited for directly supplying the electrical loads of devices like exterior lamps. Consequently, the ESC may be considered simply to interface the controlling devices, like stop lamp and turn signal switches, to the controlled devices, like the stop lamps and turn signal lamps, while additional devices like drivers, relays, or the like that can carry the load currents are present in circuit between the ESC and the various loads.

At various times it is desirable, or perhaps even mandated in some way, to check the operation of a vehicle's exterior lamps. Checking may be done at the factory as part of the check-out procedure for a new vehicle or after a vehicle has been placed in service.

For example, the operator or driver of a large vehicle like a heavy truck may want or require that various devices, including exterior lamps, be checked before embarking on a run. Because the controls for the exterior lamps are inside the cab while the exterior lamps themselves are on the outside where they may not be properly observed by a person inside the cab, the process of checking the exterior lamps requires more than one person, one inside the cab to operate the various controls and one or more persons outside to observe the lamps. Verbal and/or visual communication between the person inside the cab and the person or persons outside occurs as the check-out proceeds.

While an automated test capability may be available in certain vehicles for testing vehicle exterior lamps, insofar as the inventors are aware that capability tests only the lamps themselves, not the full circuitry that includes the controlling devices, because the automated test is embodied in an algorithm in the ESC that does not depend on the ESC receiving actual inputs from the controlling devices during exterior device testing. That automated test capability merely simulates the operation of the controlling devices internally of the ESC, typically, although not necessarily, in a pre-programmed sequence for operating the lamps in that sequence so as to enable a person observing the lamps to verify that they have illuminated in accordance with the sequence.

The test can show that a lamp which fails to illuminate when it should is either itself defective, or that the circuit between the lamp and the ESC is defective, or that the ESC is itself defective. However, the test has no way of disclosing a defect in a control device or in circuitry between a control device and the ESC because the function performed by the control device is merely simulated, instead of the control device itself being actuated. In other words, that test merely checks the functionality of the output portion of the entire circuit, not the input portion.

SUMMARY OF THE INVENTION

The present invention relates to an electrical system and method in a motor vehicle for testing a complete electric circuit that comprises a controlling device, such as a switch, on the interior of the vehicle and a controlled device, such as an exterior lamp, that is on the exterior of the vehicle.

Unlike the known automated testing discussed above, the present invention enables the input circuit that includes the controlling device to also be checked during the process. Briefly, the invention comprises the inclusion of an algorithm in an ESC that in a "learn" mode, learns a sequence during which controlling devices are actually actuated by a person inside the vehicle, and that in a subsequently performed "playback" mode, operates the controlled devices in accordance with the learned sequence. With the learned sequence stored as data in the ESC, the person inside the vehicle is afforded time to exit and observe the exterior devices before the "playback" mode begins.

During the "learn" mode, the person operates the various controlling devices in accordance with a check list that, by the way, can be varied as desired. The check list can set forth not only the sequence, but the amount of time for actuation of a controlling device. The ESC stores the time at which a controlling device begins to be actuated and for how long it continues to be actuated. Overlapping actuations of various controlling devices are permissible, and repeated actuations of a particular controlling device are also permissible.

Once the "learn" mode has ended, the "playback" mode can be performed. Performance may start based on an amount of time that should be sufficient to allow the person inside the vehicle to exit and assume a vantage point on the outside to begin to observe the external devices for operation in accordance with the learned sequence. Any device that is observed not to operate in accordance with the learned sequence indicates a defect somewhere in the entire corresponding circuit, not merely the output portion between the ESC and the exterior device.

Accordingly, one general aspect of the invention relates to a transportation vehicle comprising an interior comprising controlling devices accessible for selective actuation by an occupant of the interior and an exterior comprising controlled devices. An electrical system comprises an electrical system controller (ESC) through which the controlling devices control the controlled devices.

The ESC comprises processor apparatus. The processor apparatus operates to cause a particular controlled device to respond to actuation of a particular controlling device. During a learn mode of a test, the processor apparatus executes a learn algorithm that causes the ESC to store data related to actual actuation of the controlling devices occurring during the learn mode. During a playback mode of the test, the processor apparatus executes a playback algorithm that causes the ESC to actuate the controlled devices in accordance with the stored data.

Another general aspect of the invention relates to a method for testing operation of that portion of a transportation vehicle's electrical system that comprises controlling devices that are accessible for selective actuation by an occupant of an interior of the vehicle to control controlled devices on the exterior of the vehicle through an electrical system controller (ESC).

The ESC comprises processor apparatus for causing a particular controlled device to respond to actuation of a particular controlling device.

During a learn mode of the testing operation, the processor apparatus executes a learn algorithm stored in the ESC and the controlling devices are actuated as the learn algorithm executes, causing the ESC to store data related to actuation of the controlling devices.

During a playback mode of the testing operation, the processor apparatus executes a playback algorithm, causing the ESC to actuate the controlled devices in accordance with the stored data.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
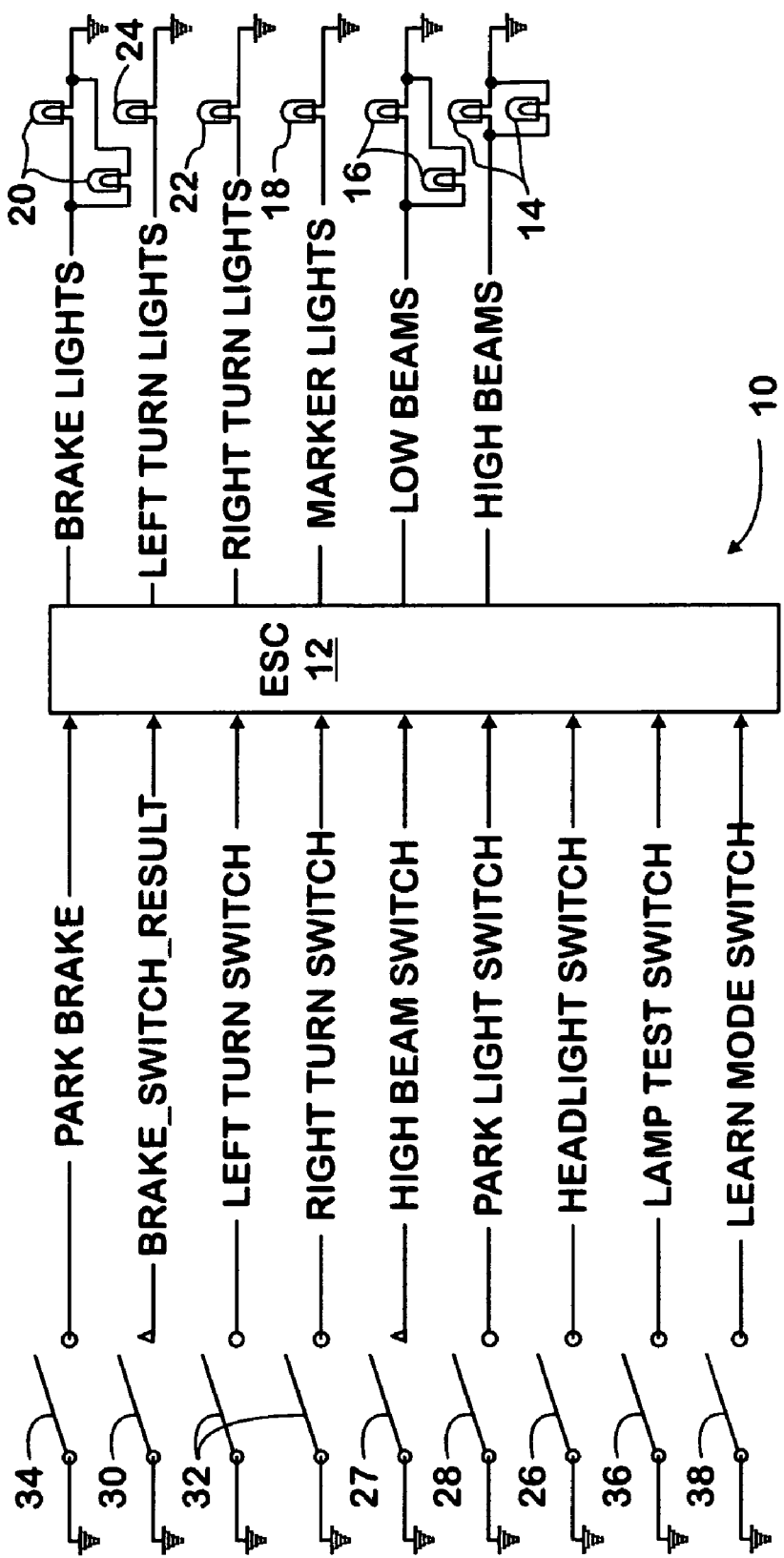
FIG. 1 is a general schematic diagram of a portion of a motor vehicle electrical system relevant to principles of the present invention.

FIG. 1 shows a portion of a motor vehicle electrical system 10 comprising an electrical system controller (ESC) 12 having a number of inputs from various controlling devices and a number of outputs for operating various controlled devices.

In accordance with principles of the invention the various controlling devices are disposed within the interior of the motor vehicle, such as in the vehicle instrument cluster or panel while the various controlled devices are disposed on the exterior of the vehicle.

The controlled devices shown are the following exterior lamps: right and left headlamps each having a high-beam element 14 and a low-beam element 16, marker lamps 18 that include parking lamps (not separately shown), stop lamps 20, and right and left turn signal lamps 22, 24.

The controlling devices are interior switches disposed for operation by a person seated in a driver's seat inside the vehicle. The illustrated controlling devices are: a headlamp switch 26 for turning the headlamps on and off, including a switch 27 for selecting between high-beams and low-beams, a park lamp switch 28 for turning marker lamps 18 on and off, a brake switch 30 for turning stop lamps 20 on and off, and a turn signal switch 32 for turning the turn signal lamps 22, 24 on and off.

Additional switch inputs to ESC 12 are: a park brake switch 34, a lamp test switch 36, and a learn mode switch 38.

All switches are shown in their off positions.

ESC 12 typically comprises electronic devices organized and arranged to receive data inputs, like the ones from the switches shown in FIG. 1, to process data according to programmed strategies and algorithms, and to provide data outputs, such as ones to the lamps shown. When a switch that controls a particular lamp is switched from off to on, it issues a corresponding data input indicative of the switch status to ESC 12. ESC 12 acts on that input by issuing an output that results in the particular lamp being turned on.

For example, when the service brakes of the vehicle are applied, brake switch 30 closes to apply a ground to the respective input of ESC 12. The ground is recognized by ESC 12 as a data signal calling for stop lamps 20 to illuminate. ESC 12 thus issues a signal at the respective output to cause the stop lamps to illuminate.

On occasion, such as before a trip, it is necessary to check the operation of a vehicle's exterior lamps to make sure they are properly functioning. In accordance with the invention, this is done by providing processor apparatus of ESC 12 with a test algorithm.

Figure 2:
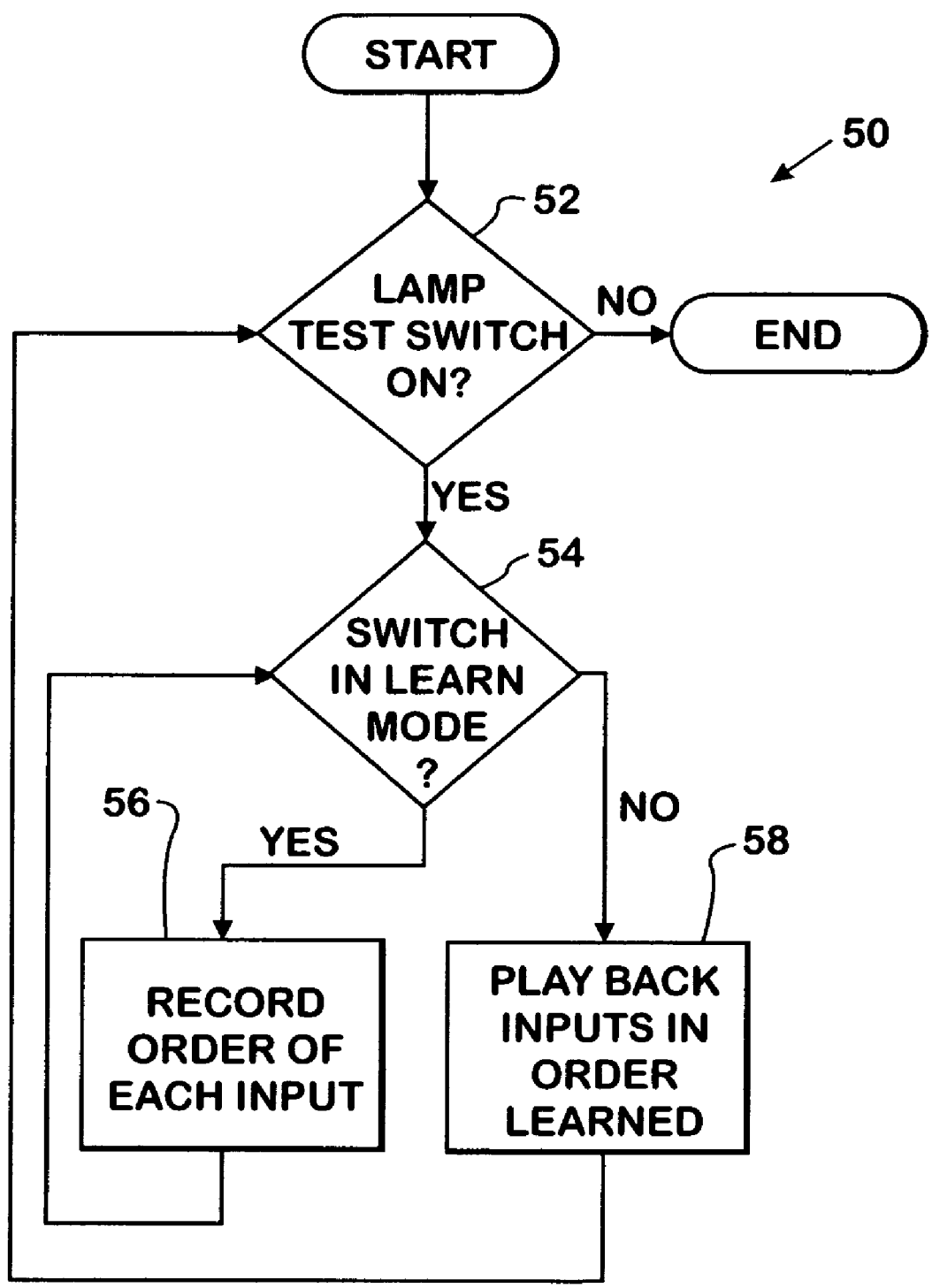
FIG. 2 is a flow diagram of processing strategy in a processor portion of the electrical system for executing learn and playback algorithms.

FIG. 2 shows a flow diagram 50 representing that algorithm. It comprises a "learn" mode and a "playback" mode, and is implemented by programming the processor apparatus with software according to the flow diagram.

Initiation of a test by a person inside the vehicle commences with operation of a particular switch, such as switch 36 (step 52 in FIG. 2). When switch 36 closes, it informs ESC 12 that a test is about to occur. The algorithm begins to execute the learn mode when a further switch, such as switch 38 is turned on (step 54 in FIG. 2).

During the learn mode, the person actuates switches 26, 27, 28, 30, 32 according to a desired sequence, with each switch being actuated for a desired amount of time. As it executes, the algorithm causes ESC 12 to store data related to actual actuation of the switches during the learn mode (step 56). For example, the time at which each switch is turned on and the duration for which it remains on are recorded in memory of the processor apparatus.

The person performing the test may use a written check list containing the sequence of switch operations and the on time for each switch operation as the basis for actuating of the switches.

After completion of the switch actuation sequence of the check list, the person performing the test terminates the learn mode by turning switch 38 off. The algorithm is now capable of executing the playback mode using the data learned during the learn mode.

The playback mode can be invoked by actuation of a switch or by simply providing a delay time at the end of the learn mode before playback starts. If a switch is actuated, it should allow ample time for the person performing the test to exit the vehicle before playback actually begins, just like the delay time between the two modes that is provided when no switch actuation is required to start playback.

In playback mode, ESC 12 causes the lamps to be operated in accordance with the stored data so that each illuminates at the same time as the corresponding switch was turned on during the learn mode and each remains illuminated for the same duration as the corresponding switch remained on during the learn mode (step 58 of the algorithm). Because the algorithm allows the person who operated the interior switches time to exit the vehicle and observe the exterior lamps before the playback begins, a test can be performed by a single person. Moreover, a test checks not only each lamp, but also the entire lamp circuit including the switch. A defect in any portion of any of the lamp circuits is observed by failure of a lamp in the circuit to illuminate in accordance with the checklist sequence, as performed during the learn mode.

A test may be terminated in any suitably appropriate way. By using park brake switch 34, a test will terminate when the park brake is released.

While a presently preferred embodiment of the invention has been illustrated and described, it should be appreciated that principles of the invention are applicable to all embodiments that fall within the scope of the following claims. For example, while exterior lamps are the primary devices of interest, other external devices that cannot be seen from the vehicle interior can be checked, including not only factory installed devices but devices that are added by a dealer or customer.

What is claimed is:

1. A transportation vehicle comprising:
    an interior comprising controlling devices accessible for selective actuation by an occupant of the interior;
    an exterior comprising controlled devices;
    an electrical system comprising an electrical system controller (ESC) through which the controlling devices control the controlled devices;
    in which the ESC comprises processor apparatus for causing a particular controlled device to respond to actuation of a particular controlling device, and for at times performing a test that comprises execution of a learn algorithm during a learn mode of the test for causing the ESC to store data related to actual actuation of the controlling devices occurring during the learn mode, and that comprises execution of a playback algorithm during a playback mode of the test for causing the ESC to actuate the controlled devices in accordance with the stored data,
    in which the learn algorithm causes the ESC to store data representing a sequence of actuation of the controlling devices during the learn mode, and the playback algorithm causes the ESC to actuate the controlled devices during the playback mode in the sequence defined by the stored data representing the sequence of actuation of the controlling devices during the learn mode, and
    in which the learn algorithm also causes the ESC to store data representing the duration of actuation of each controlling device during the learn mode, and the playback algorithm also causes the ESC to actuate each controlled device during the playback mode for the respective duration of actuation defined by the stored data representing the duration of actuation of each controlling device during the learn mode.

2. A transportation vehicle as set forth in claim 1 including a control for selectively placing the ESC in the learn mode.

3. A transportation vehicle as set forth in claim 1 in which the controlled devices comprise exterior lamps and the controlling devices comprise switches.

4. A transportation vehicle as set forth in claim 3 in which the exterior lamps are disposed on the exterior of a vehicle body and include headlamps, marker lamps, stop lamps, and turn signal lamps, and the switches are disposed within an interior occupant compartment and comprise a headlamp switch for turning the headlamps on and off, a park lamp switch for turning the marker lamps on and off, a brake switch for turning the stop lamps on and off, and a turn signal switch for turning the turn signal lamps on and off.

5. A transportation vehicle as set forth in claim 2 in which the control for selectively placing the ESC in the learn mode comprises a switch for invoking the learn mode.

6. A transportation vehicle as set forth in claim 2 in which the control for selectively placing the ESC in the learn mode comprises a switch for both commencing and terminating the learn mode.

7. A transportation vehicle as set forth in claim 2 including a control for selectively placing the ESC in the playback mode after termination of the learn mode.

8. A transportation vehicle as set forth in claim 1 in which the ESC provides a time delay between the termination of the learn mode and the commencement of the playback mode.

9. A method for testing operation of that portion of a transportation vehicle's electrical system that comprises controlling devices that are accessible for selective actuation by an occupant of an interior of the vehicle to control controlled devices on the exterior of the vehicle through an electrical system controller (ESC) that comprises processor apparatus for causing a particular controlled device to respond to actuation of a particular controlling device, the method comprising:
    during a learn mode of a test, causing the processor apparatus to execute a learn algorithm stored in the ESC and as the learn algorithm executes, actuating the controlling devices and causing the ESC to store data related to actuation of the controlling devices;
    and during a playback mode of the test, causing the processor apparatus to execute a playback algorithm stored in the ESC to cause the ESC to actuate the controlled devices in accordance with the stored data;
    in which the learn algorithm executes so as to cause the ESC to store data representing a sequence of actuation of the controlling devices during the learn mode, and the playback algorithm executes so as to cause the ESC to actuate the controlled devices during the playback mode in the sequence defined by the stored data representing the sequence of actuation of the controlling devices during the learn mode and
    in which the learn algorithm also executes so as to cause the ESC to store data representing the duration of actuation of each controlling device during the learn mode, and the playback algorithm also executes so as to cause the ESC to actuate each controlled device during the playback mode for the respective duration of actuation defined by the stored data representing the duration of actuation of each controlling device during the learn mode.

10. A method as set forth in claim 9 in which execution of the learn algorithm is initiated by actuating a control.

11. A method as set forth in claim 9 including the step of imposing a time delay between the termination of the learn algorithm and initiation of the playback algorithm.

12. A method as set forth in claim 9 in which the controlled devices comprise exterior lamps, and the step of actuating the controlling devices as the learn algorithm executes comprises actuating control switches that turn the exterior lamps on and off.

13. A method as set forth in claim 9 in which the controlled devices comprise headlamps, marker lamps, stop lamps, and turn signal lamps disposed on the exterior of a vehicle body, and the step of actuating the controlling devices as the learn algorithm executes comprises selectively actuating respective control switches that turn the headlamps, marker lamps, stop lamps, and turn signal lamps on and off.

14. A method as set forth in claim 10 in which the playback algorithm is initiated by actuating a control.

15. A method as set forth in claim 10 in which the step of actuating a control comprises actuating a control switch.

16. A method as set forth in claim 10 in which the execution of the learn algorithm is both initiated and terminated by actuating the control.

\* \* \* \* \*